(12) United States Patent
Yoo et al.

(10) Patent No.: US 9,322,099 B2
(45) Date of Patent: Apr. 26, 2016

(54) SELF-CLEANING ARTICLE AND A PROCESS FOR PREPARING THE SAME

(75) Inventors: Hye Jin Yoo, Gwangyang-si (KR); Wook Hyun Song, Bucheon-si (KR); Gab Yong Kim, Incheon (KR); Jae Ryung Lee, Goyang-si (KR); Jae Dong Cho, Siheung-si (KR)

(73) Assignees: POSCO, Pohang-si (KR); Noroo Holdings Co., Ltd., Anyang-si (KR)

( * ) Notice: Subject to any disclaimer, the term of this patent is extended or adjusted under 35 U.S.C. 154(b) by 788 days.

(21) Appl. No.: 12/639,652

(22) Filed: Dec. 16, 2009

(65) Prior Publication Data
US 2010/0167066 A1 Jul. 1, 2010

(30) Foreign Application Priority Data
Dec. 31, 2008 (KR) .......................... 10-2008-0138310

(51) Int. Cl.
| | |
|---|---|
| *B32B 15/04* | (2006.01) |
| *C23C 22/44* | (2006.01) |
| *B01J 21/06* | (2006.01) |
| *B01J 23/02* | (2006.01) |
| *B01J 23/22* | (2006.01) |
| *B01J 23/28* | (2006.01) |
| *B01J 23/34* | (2006.01) |
| *B01J 35/00* | (2006.01) |
| *B01J 37/02* | (2006.01) |
| *B01J 37/03* | (2006.01) |

(Continued)

(52) U.S. Cl.
CPC ............... *C23C 22/44* (2013.01); *B01J 21/063* (2013.01); *B01J 23/02* (2013.01); *B01J 23/22* (2013.01); *B01J 23/28* (2013.01); *B01J 23/34* (2013.01); *B01J 35/004* (2013.01); *B01J 37/0225* (2013.01); *B01J 37/033* (2013.01); *C09D 1/04* (2013.01); *C09D 5/084* (2013.01); *C09D 5/1618* (2013.01); *C23C 18/122* (2013.01); *C23C 18/127* (2013.01); *C23C 18/1225* (2013.01); *C23C 18/1241* (2013.01); *C23C 18/1254* (2013.01); *C23C 2222/20* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 6,228,480 | B1 * | 5/2001 | Kimura et al. | ................ 428/328 |
| 7,052,770 | B2 | 5/2006 | Furuya et al. | |

(Continued)

FOREIGN PATENT DOCUMENTS

| | | |
|---|---|---|
| EP | 1375615 A2 | 1/2004 |
| EP | 1992718 A1 | 11/2008 |

(Continued)

OTHER PUBLICATIONS

Hawley's Condensed Chemical Dictionary, 14th Edition, John Wiley & sons, Inc. (2002),definition of solvent.*

(Continued)

*Primary Examiner* — Kenneth Stachel
(74) *Attorney, Agent, or Firm* — The Webb Law Firm

(57) ABSTRACT

Provided is a composition for forming a photocatalytic coating layer, a process for preparing said composition, a self-cleaning article comprising a photocatalytic coating layer comprising said composition and a process for preparing said self-cleaning article. The composition may be used to prepare a self-cleaning article having excellent anticorrosion and processability by one coating and drying procedure, without several coating and drying procedures.

2 Claims, 4 Drawing Sheets

(51) Int. Cl.
*C09D 1/04* (2006.01)
*C09D 5/08* (2006.01)
*C09D 5/16* (2006.01)
*C23C 18/12* (2006.01)

(56) References Cited

U.S. PATENT DOCUMENTS

| | | | |
|---|---|---|---|
| 2004/0110012 A1* | 6/2004 | Bier et al. | 428/422.8 |
| 2005/0022908 A1* | 2/2005 | Tounaka et al. | 148/248 |
| 2005/0037227 A1* | 2/2005 | Endo et al. | 428/624 |
| 2005/0191505 A1 | 9/2005 | Akarsu et al. | |
| 2005/0266981 A1* | 12/2005 | Nakajima et al. | 502/150 |
| 2009/0022898 A1* | 1/2009 | Standke et al. | 427/384 |
| 2009/0110921 A1* | 4/2009 | Kaneto et al. | 428/341 |
| 2009/0142589 A1* | 6/2009 | Shoji et al. | 428/336 |
| 2009/0181256 A1* | 7/2009 | Sharma | 428/428 |
| 2013/0180932 A1* | 7/2013 | Fukumura et al. | 210/749 |

FOREIGN PATENT DOCUMENTS

| | | | |
|---|---|---|---|
| JP | 2004058673 A | | 2/2004 |
| JP | 2004359902 A | | 12/2004 |
| JP | 2005097719 A | | 4/2005 |
| JP | 2005296836 A | | 10/2005 |
| JP | 2007144864 A | * | 6/2007 |
| JP | 2007177314 A | * | 7/2007 |

OTHER PUBLICATIONS

English machine translation from (IPDL) for JP 2007144864 (2007).*

English machine translation from (IPDL) for JP 2004359902(2004).*

JP 2007177314 English machine translation (2007).*

* cited by examiner

| Conventional self-cleaning steel sheet | Present invention GI Cr-free | photocatalytic self-cleaning steel sheet | |
|---|---|---|---|
| | | prior to UV irradiation | after UV irradiation |
| 60~77" | 50" | 12" | 8" |

SELF-CLEANING ARTICLE AND A PROCESS FOR PREPARING THE SAME

TECHNICAL FIELD

The present invention relates to a composition for forming a photocatalytic coating layer, a process for preparing said composition, a self-cleaning article comprising a photocatalytic coating layer comprising said composition and a process for preparing said self-cleaning article.

BACKGROUND ART

Surface appearances in outside buildings exposed always to exterior environment are easily stained due to pollution factors such as dust or mote and rain or snow, so that routine management is required for cleaning. Therefore, to reduce increase of management expenses maximally, related industries have performed continuous researches.

In case of steel sheets for home electric appliances used almost indoors contrary to building materials exposed to outside, they were basically interrupted with pollution factors and not required for cleaning articles to be devoid of related researches. However, in case of air conditioners placed outside, they are exposed to pollution environment as such, so that their appearances are easily stained. Therefore, related industries have developed continuous researches as a plan for improving contamination, in order to combine self-cleaning property applied to building materials with steel sheets for air conditioners.

Self-cleaning steel sheets are steel sheets for providing them with a function to clean pollution sources on a coated film by rainwater, and the like, for themselves, and may be classified broadly into hydrophilic self-cleaning steel sheets, photocatalytically hydrophilic self-cleaning steel sheets, hydrophobic self-cleaning steel sheets, and the like, depending on self-cleaning principle.

The hydrophilic self-cleaning steel sheets are steel sheets which clean pollution sources by lowering a water contact angle in a surface of a coating layer (contact angle: 40 degrees or less, surface tension: 30 mN/m or more) to scatter rainwater, and the like, evenly over all the surface of the coated film, and provide a surface of a coating layer by 1~2 µm with hydrophilicity, using hydrophilic organic polymers. Said hydrophilic organic polymers may include polyalkylsilicate, perhydropolysilazane, and the like.

The photocatalytically hydrophilic self-cleaning steel sheets are steel sheets which degrade organics using $TiO_2$, and the like, having a photo activation effect and then provide self-cleaning property thereto using hydrophilicity of a coating layer itself.

The hydrophobic self-cleaning steel sheets are steel sheets which clean pollution sources on a surface of a coated film by increasing water contact angle in a surface of a coating layer (contact angle: 120 degrees or more, surface tension: 15 mN/m or less) to repel and roll down rainwater. Depending on a configuration method, there are a hydrophobic coating (fluorine-based coating, and the like), a nanostructure coating, a plasma surface modification method, and the like. Said hydrophobic coating is a coating that materials such as fluorine-based materials having high hydrophobicity are focused on a surface of a coating layer to provide hydrophobicity thereto, said nanostructure coating is a coating utilizing a leaf structure in a lotus flower, which provides projections in a micro size with a ciliated structure in a nano size to represent superhydrophobicity, and said plasma surface modification method is a method which provides a surface with hydrophobicity through a plasma treatment.

The self-cleaning steel sheet coated with a hydrophilic organic polymer is a steel sheet that an organic resin in a hydrophilic thick film (a thickness of about 20 µm) is focused on a surface of the coated film to wash and clean contaminants with rainwater, and the like. There is an advantage that it is inexpensive and easily ensures anticorrosion and antistatic effect, while there is an disadvantage that a film thickness of at least 5 µm should be required to ensure other physical properties.

In addition, the photocatalytically hydrophilic self-cleaning steel sheet using $TiO_2$ is a steel sheet that contaminants are degraded and cleaned with surface oxidation action of a photocatalyst by ultraviolet, which is capable of being formed in a thin film (<1 µm) and useful in removing NOx, SOx, and the like, but there is an disadvantage of representing self-cleaning property via photoreaction only under irradiation of ultraviolet.

Furthermore, it is noted that the photocatalytically hydrophilic self-cleaning steel sheet represents superhydrophilicity using porous silica-metal nanocomposites. Said self-cleaning steel sheet representing superhydrophilicity may exhibit superhydrophilicity without irradiating it with ultraviolet. Thus, there is an advantage that it may be applied to interior application fields as well as exterior application fields, while there is a disadvantage that development of applicable technology in coating steel sheets is required.

The fluorine-based hydrophobic self-cleaning steel sheet of hydrophobic self-cleaning steel sheets is a steel sheet that a fluorine compound on a surface gives hydrophobicity thereto to remove contaminants with water. There is an advantage that deposit of contaminants is low, while there is a disadvantage that a fluorine-based compound is difficult to be focused on a surface and flushing capacity is lowered under pollution environment in oil stains. In addition, the hydrophobic self-cleaning steel sheet with a nano projection structure is a steel sheet that hydrophobic nano projections are formed to remove contaminants with water. There is an advantage that deposit of contaminants is low and flushing capacity is good, but there is a disadvantage that after processing, it is difficult to maintain the nano projection structure, that is, durability is poor.

Moreover, in addition to each disadvantage as described above, there is a problem that they have limits on applying to application fields requiring good anticorrosion and processability, and the like, since the conventional self-cleaning steel sheets as described above consider only the self-cleaning property.

Accordingly, the present invention is intended to provide a self-cleaning article having excellent anticorrosion and processability as well as excellent self-cleaning property and a process for preparing the same.

SUMMARY OF THE INVENTION

The present invention provides a composition characterized in that it comprises a cohydrolysis condensate of a $SiO_2$ sol, silane and a $TiO_2$ sol, wherein said cohydrolysis condensate comprises a unit of —Si—O—Ti—, a process for preparing said composition, a self-cleaning article comprising a photocatalytic coating layer comprising said composition and a process for preparing said self-cleaning article.

The composition according to the present invention may be used to prepare a self-cleaning article having excellent anticorrosion and processability by one coating and drying procedure, without several coating and drying procedures.

DETAILED DESCRIPTION FOR CARRYING OUT INVENTION

Figure 1:
FIG. 1 is a SEM photograph of a cross-section in a coating layer of the present invention.

The present invention provides a composition characterized in that it comprises a cohydrolysis condensate of a $SiO_2$ sol, silane and a $TiO_2$ sol, wherein said cohydrolysis condensate comprises a unit of the following Formula 1:

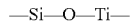  [Formula 1]

The present invention is characterized in that to form a self-cleaning coating layer, a composition, wherein a $SiO_2$ sol and a $TiO_2$ sol are prepared separately and then mixed simply and physically, is not used, but a composition, wherein Si present in silane and a $SiO_2$ sol and Ti present in a $TiO_2$ sol are chemically bonded by using silane, a $SiO_2$ sol and a $TiO_2$ sol together to proceed the sol-gel reaction, is used.

The present composition uses a $SiO_2$ sol. The $SiO_2$ sol is used to enhance anticorrosion and stability of the present composition.

In one embodiment, said $SiO_2$ sol is not particularly limited, but may be a $SiO_2$ sol that silica in a nano size is water-dispersed. If silica in a nano size is used, anticorrosion, stability of a solution and scratch resistance of a film may be improved. In one aspect, silica in a nano size may be silica having a diameter of 5~20 nm. A content ratio of silica included in the $SiO_2$ sol may be 20 to 40% by weight, without limiting thereto. To introduce silica in a form of the water-dispersed $SiO_2$ sol is because water used as a disperse medium of silica may be used as water required for cohydrolysis condensation of silane occurring on a sol-gel reaction of silane, a $SiO_2$ sol and a $TiO_2$ sol.

In another embodiment, said $SiO_2$ sol may be an acidic or neutral $SiO_2$ sol. In the present invention, it is preferred that the sol-gel reaction of silane, a $SiO_2$ sol and a $TiO_2$ sol is carried out under an acidic condition. The reason is because the cohydrolysis condensation occurring on said sol-gel reaction needs an acid catalyst. If the alkaline $SiO_2$ sol is used, a secondary treating procedure which controls pH by adding further an acid is not only carried out, but also stability of silica particles stabilized with an alkali may be lowered on introducing an acid to precipitate silica. However, the acidic $SiO_2$ sol has excellent reactivity and adhesiveness with a substrate, compared to the alkaline $SiO_2$ sol. Therefore, when the acidic $SiO_2$ sol is used, stability of a solution and transparency of a film after coating are improved.

In other embodiment, said $SiO_2$ sol may be included in an amount of 1 to 20 parts by weight based on a solid content of silica, relative to 100 parts by weight of the total composition.

If the $SiO_2$ sol is included in an amount of less than 1 part by weight, anticorrosion and stability of the present composition are lowered. If it is included in an amount of more than 20 parts by weight, transparency of the film formed with the present composition is lowered and the film is brittle on processing the substrate.

The present composition also includes silane. The silane serves to bond between a member on which a self-cleaning coating layer is coated and silica, or silica and silica.

In on embodiment of the present invention, said silane may be one component selected from the group consisting of tetramethoxysilane, tetraethoxysilane, methyltrimethoxysilane, methyltriethoxysilane, dimethyldimethoxysilane, dimethyldiethoxysilane, phenyltrimethoxysilane, diphenyldimethoxysilane, decyltrimethoxysilane, vinyltrimethoxysilane, vinyltriethoxysilane, 2-(3,4-epoxycyclohexyl)-ethyltrimethoxysilane, 3-glycidoxypropyl trimethoxysilane, 3-glycidoxypropylmethyldiethoxysilane, 3-glycidoxypropyltriethoxysilane, 3-methacryloxypropylmethyldimethoxysilane, 3-methacryloxypropylmethyldiethoxysilane, 3-methacryloxypropyltrimethoxysilane, 3-methacryloxypropyltriethoxysilane, N-(2-amino ethyl)-3-aminopropylmethyldimethoxysilane, N-(2-amino ethyl)-3-aminopropyltrimethoxysilane, N-(2-aminoethyl)-3-aminopropyltriethoxysilane, 3-aminopropyltrimethoxysilane, and 3-aminopropyltriethoxy silane, or a cohydrolysis condensate of at least two components thereof.

The silane is the principal ingredient for forming a film. To improve formation and a drying speed of a film, it is preferred to use a combination of a tetrafunctional silane and a trifunctional silane. If only the tetrafunctional silane is used, a film is brittle and a molecular weight of a solution is maximized to lower stability. If only the trifunctional silane is used, the drying speed and a post cure speed are insufficient to cause a phenomenon that it adheres to a line strip roll, with easily causing a blocking phenomenon on stacking.

In one embodiment, said silane is, preferably, included in an amount of 1 to 30 parts by weight, relative to 100 parts by weight of the total composition. The film may satisfy preferred physical properties such as hardness, the drying speed, and the post cure speed in said range.

The present composition further comprises a $TiO_2$ sol. The $TiO_2$ sol is an ingredient which provides a member coated with the present composition with a self-cleaning effect by a photocatalytic performance.

A wavelength of a photocatalyst representing a photocatalytic reaction is a near-ultraviolet having near 40 nm. The photocatalytic reaction is a heterogeneous catalytic reaction that a reaction site is limited to a surface of a catalyst.

When the photocatalytic $TiO_2$ has light, the following tree reactions occur at the same time.

1) Electrons ($e^-$) and holes ($h^+$) are produced to react with $H_2O$ in air, wherein reactions of $O_2$ in air with $e^-$, and of $H_2O$ with $h^+$ are performed.

2) Two kinds of active oxygen, superoxide anions ($O_2^-$) and hydroxyl radicals ($OH^-$), are generated on surfaces of $TiO_2$.

3) O and $H_2O$ are reacted to form Ti—OH having very good affinity for water on surfaces of $TiO_2$.

The reaction rate in all the photocatalytic reactions is proportional to a light intensity by a certain degree and to a square root of a light intensity at 250 W/m² or more.

Characteristics represented by the photocatalytic reactions are classified broadly into two kinds, oxidative degradation property and superhydrophilicity.

The oxidative degradation property of a photocatalyst is contributed to powerful oxidation performance. A hydroxyl radical to be the source of oxidative power in the photocatalyst has about twice the oxidative power compared to an oxidant such as ozone or chlorine, and thus provides a self-cleaning effect by degrading contaminants, bacteria, bad smell, NOx and the like, which are attached to a surface, via a photocatalytic reaction.

The superphilicity by a photocatalyst represents high hydrophilicity, when the $TiO_2$ surface is irradiated with ultraviolet, and is allowed, such that it has a water contact angle, which represents the measure of hydrophilicity, of 5° or less. If the condition is optimized, it represents a contact angle of near 0°. When the light irradiation ceased, the reaction has been sustained for several hours to one week and then gradually returned to a hydrophobic condition prior to the light irradiation. If it is again irradiated with light, it represents hydrophilicity and deserves to be in a semi-permanent condition. Such superhydrophilicity by a photocatalyst is allowed for water to be scattered on a surface, so that contaminants are difficult to be attached thereto and easy to be washed with rainwater, and the like, if they are attached thereto. Therefore, the composition represents a self-cleaning effect.

The present composition may form a film representing anticorrosion, processability and self-cleaning property by one coating, without separately coating a Si-based film and a $TiO_2$ film. Si has an adhesion with a steel sheet, while Ti is not adhered thereto. Therefore, almost Ti is positioned on a film surface to form a photocatalytic self-cleaning film, although the mixed Ti and Si are present in the composition via a sol-gel reaction.

In on embodiment of the present invention, the $TiO_2$ sol may be an acidic or neutral $TiO_2$.

Generally, if $TiO_2$ in a form of powder is simply mixed with a binder such as $SiO_2$, and the like, the mixing is not good. Especially, if much $TiO_2$ is added thereto, it is not only difficult to be mixed with main resin, but also difficult to obtain a stable solution. In addition, even if it is mixed therewith, the surface appearance after coating becomes clouded and the binding effect is lowered to cause a disintegration phenomenon. As a result, the film is not formed stiffly and thus results in lowering anticorrosion and self-cleaning property. If a $TiO_2$ sol and a $SiO_2$ sol are simply mixed to be used, the mixed solution of these represents an excessively sticky state, so that it is not only difficult to be applied, but also difficult to be applied as a coating layer, since it has a low binding effect and a low anticorrosion, when it is applied on an article. To avoid such problems, a $TiO_2$ sol dispersed in water herein, not $TiO_2$ in a form of powder, is subjected to a sol-gel reaction, together with silane and a $SiO_2$ sol, and used. Another reason that $TiO_2$ is introduced in a form of $TiO_2$ sol dispersed in water is because water used as a dispersing medium for $TiO_2$ may be used as water required for cohydrolysis condensation of silane which is carried out on a sol-gel reaction of silane, a $SiO_2$ sol and a $TiO_2$ sol.

Especially, if an acidic $TiO_2$ sol is used, adhesion improved by an etching effect to a metal surface may be expected. Also, preferably, there is no need to additionally introduce an acid on a sol-gel reaction of silane, a $SiO_2$ sol and a $TiO_2$ sol. That is, the acidic $TiO_2$ sol may be used as a substitute of an acid catalyst on a cohydrolysis condensation of silane which is carried out on a sol-gel reaction of silane, a $SiO_2$ sol and a $TiO_2$ sol.

In one embodiment, said $TiO_2$ sol may be included in an amount of 5 to 60 parts by weight, relative to 100 parts by weight of the total composition. If the $TiO_2$ sol is included in an amount of less than 5 parts by weight, the photocatalytic action is insufficient. If the $TiO_2$ sol is included in an amount of more than 60 parts by weigh, the binding effect is so impaired that the film is not formed.

The present composition may also comprise at least one additive for anticorrosion selected from the group consisting of an organic acid salt, an inorganic acid salt and a hydroxide of a metal.

In one embodiment of the present invention, it is preferred that said metal is chemically coupled to Si, like Ti, to comprise a unit represented by Formula 2 below.

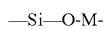  [Formula 2]

wherein, M represents a metal.

Said metal may be at least one metal selected from the group consisting of Al, Ti, Mo, V, Mn, Mg and Zr.

In other embodiment, said metal may be at least one metal selected from the group consisting of Ti, Zr, V and Mn.

For example, the additive for anticorrosion used in the present composition may be at least one component selected from the group consisting of phosphate, nitrate, carbonate, acetate, and hydroxide of said at least one metal. It is preferred to use a combination of an inorganic acid salt and a modified phosphate of Ti, Zr, V, and Mn.

In one embodiment of the present invention, said additive for anticorrosion may be included in an amount of 0.1 to 5 parts by weight, relative to 100 parts by weight of the total composition. If said additive for anticorrosion is included in an amount of 0.1 parts by weight, it is not helpful to improve anticorrosion of the film. If said additive for anticorrosion is included in an amount of more than 5 parts by weight, the solution stability is lowered, so that the solution may gelate.

The present composition may further comprise an organic solvent, an additive for forming a surface, water, and the like.

Said organic solvent may include, but not limited to, for example, an alcohol such as methanol, ethanol, isopropanol and N-butanol or a hydrophilic organic solvent such as ethylene glycol, propylene glycol, butyl cellosolve, ethyl cellosolve, diacetone alcohol and acetyl acetone. Preferably, the hydrophilic organic solvent is included in an amount of 5 to 30 parts by weight, relative to 100 parts by weight of the total composition. If the organic solvent is included in an amount of less than 5 parts by weight, the solution stability is lowered and the solution drying speed slows down. In addition, if the organic solvent is included in an amount of more than 30 parts by weight, volatilization of the solvent causes many problems in workability on roll working and the solvent volatilized on curing causes a problem of harmful vapors, and the like.

As said additive for forming a surface, a defoamer, a leveling agent, and the like may be added, and included in an amount of 1 to 10 parts by weight, relative to 100 parts by weight of the total composition.

In addition, water may be included in an amount of 30 to 90 parts by weight and a solid content included in an amount of 5 to 50 parts by weight, relative to 100 parts by weight of the total composition.

The composition according to the present invention has a concentration of about 5 to 50% by mass, based on the concentration of solid contents.

Furthermore, the present invention provides a process for preparing a cohydrolysis condensate of a $SiO_2$ sol, silane and a $TiO_2$ sol comprising a step of preparing a silane solution; and a step of mixing a mixed solution of a $SiO_2$ sol and a $TiO_2$ sol with said silane solution to be subjected to a sol-gel reaction of the $SiO_2$ sol, silane and the $TiO_2$ sol, and a cohydrolysis condensate of a $SiO_2$ sol, silane and a $TiO_2$ sol characterized in that it is prepared by said process.

As mentioned above, Si and Ti may be chemically coupled by being subjected to a sol-gel reaction of a $SiO_2$ sol, silane and a $TiO_2$ sol. Unlike the composition for photocatalytic coating that $SiO_2$ and $TiO_2$ are simply mixed to result in a bad mixture of $SiO_2$ and $TiO_2$, the composition prepared by said process may be better applied without coagulating solid contents due to a chemical bond between Si and Ti.

Preferably, said silane solution is prepared by stirring silane and at least one additive for anticorrosion selected from the group consisting of an organic acid salt, an inorganic acid salt and a hydroxide of a metal. In this case, the metal may form a chemical bond with Si as Formula 2 above to increase anticorrosion.

Furthermore, the present invention provides a self-cleaning article comprising a substrate; and a coating layer containing a composition according to the present invention applied on said substrate.

The conventional photocatalytic self-cleaning article consisting of an organic coating layer, an inorganic primer layer containing $SiO_2$ and a photocatalytic self-cleaning layer is required for applying and curing procedures of several layers, but the self-cleaning article according to the present invention is characterized by forming a film with one coat to have anticorrosion, processability and self-cleaning property.

More specifically, according to one aspect of the present invention, it is characterized in that said coating layer is one obtained by forming a layer for improving adhesion comprising a unit of [—Si—O—];

a layer for improving anticorrosion comprising a unit of [—Si—O-M-], wherein M represents a metal; and a self-cleaning layer comprising a unit of [—Si—O—Ti—] sequentially from a substrate.

That is, in the coating layer according to the present invention, the layer for improving adhesion, the layer for improving anticorrosion and the self-cleaning layer are formed sequentially in one coating layer.

Therefore, the self-cleaning article applied with the present composition represents excellent self-cleaning property, superhydrophilicity, anticorrosion, coating adhesion and organics degradation property, as can be seen from Examples below.

In one embodiment, said self-cleaning article may be a steel sheet. In one aspect, said steel sheet may be a galvanized steel sheet. Here, the galvanized steel sheet includes, for example, an electro-galvanized steel sheet, a hot-dip galvanized steel sheet, a mixed plated steel sheet of aluminum and/or silicon in addition to zinc, and the like.

Furthermore, the present invention provides a process for preparing a self-cleaning article comprising applying said composition to a surface of a substrate, followed by curing.

In one embodiment, said curing may be carried out by curing at 20 to 110° C. and air-cooling, or curing at 110 to 300° C. and water-cooling. More preferably, it may be carried out by curing at 30 to 110° C. and air-cooling, or curing at 200 to 250° C. and water-cooling.

Said curing temperature is not particularly limited, but if necessary, may be optionally selected. However, it is preferred to be subjected to air-cooling on curing at 20 to 110° C. If it is water-cooled after such curing at low temperature, it is apprehended that inorganic components in the uncured part will be washed.

In the other embodiment, said curing may be carried out for less than 1 hour. It may be carried out for, preferably, less than 30 minutes, more preferably less than 10 minutes, and most preferably less than 1 minute, possibly, for several seconds, that is, for a very short time of 1 to 10 seconds.

Benefits and features of the present invention and methods of attaining them are manifested with reference to Examples as explained in detail below. However, the present invention is not restricted to Examples as disclosed below, but is embodied in various configurations different from each other, with the proviso that these examples are provided to complete disclosure of the present invention and know those skilled in the technical field to which the present invention pertains the scope of the present invention. The present invention is defined as only the scope of claims.

EXAMPLES

Example 1

In a 4-neck flask fixed with a stirrer, a reflux condenser, a thermometer, a dropping funnel and a nitrogen introducer, 0.2 parts of zirconium tetrabutoxide, 6 parts of aminopropylmethyldimethoxy silane and 6 parts of tetraethoxy silane were sufficiently stirred, relative to the total solution, and then 16 parts of $TiO_2$ sol (pH: 2, particle diameter: 10 nm, $TiO_2$ content: 20%), 8 parts of $SiO_2$ sol (pH: 4, particle diameter: 20 nm, $SiO_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 1 part of ammonium metavanadate, 0.3 parts of hexafluorozirconic acid and 0.5 parts of phosphoric acid, a leveling agent and a defoamer were introduced, sufficiently stirred, and then packaged with a 30 micron filter.

Example 2

In a 4-neck flask fixed with a stirrer, a reflux condenser, a thermometer, a dropping funnel and a nitrogen introducer, 0.2 parts of zirconium tetrabutoxide, 6 parts of N-(2-aminoethyl)-3-aminopropyltrimethoxy silane and 6 parts of methyltrimethoxy silane were sufficiently stirred, relative to the total solution, and then 16 parts of $TiO_2$ sol (pH: 2, particle diameter: 10 nm, $TiO_2$ content: 20%), 8 parts of $SiO_2$ sol (pH: 4, particle diameter: 20 nm, $SiO_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

Example 3

In a 4-neck flask fixed with a stirrer, a reflux condenser, a thermometer, a dropping funnel and a nitrogen introducer, 0.2 parts of zirconium tetrapropoxide, 6 parts of N-(2-aminoethyl)-3-aminopropyltriethoxy silane and 6 parts of tetraethoxy silane were sufficiently stirred, relative to the total solution, and then 16 parts of TiO$_2$ sol (pH: 2, particle diameter: 10 nm, TiO$_2$ content: 20%), 8 parts of SiO$_2$ sol (pH: 4, particle diameter: 20 nm, SiO$_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

Example 4

In a 4-neck flask fixed with a stirrer, a reflux condenser, a thermometer, a dropping funnel and a nitrogen introducer, 0.2 parts of zirconium tetrabutoxide, 6 parts of aminopropyltrimethoxy silane and 6 parts of tetraethoxy silane were sufficiently stirred, relative to the total solution, and then 16 parts of TiO$_2$ sol (pH: 2, particle diameter: 10 nm, TiO$_2$ content: 20%), 8 parts of SiO$_2$ sol (pH: 4, particle diameter: 20 nm, SiO$_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

Example 5

In a 4-neck flask fixed with a stirrer, a reflux condenser, a thermometer, a dropping funnel and a nitrogen introducer, 0.2 parts of zirconium tetrabutoxide, 6 parts of aminopropyltrimethoxy silane and 6 parts of tetraethoxy silane were sufficiently stirred, relative to the total solution, and then 16 parts of TiO$_2$ sol (pH: 2, particle diameter: 10 nm, TiO$_2$ content: 20%), 6 parts of SiO$_2$ sol (pH: 4, particle diameter: 20 nm, SiO$_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

Example 6

In a 4-neck flask fixed with a stirrer, a reflux condenser, a thermometer, a dropping funnel and a nitrogen introducer, 0.2 parts of zirconium tetrabutoxide, 6 parts of aminopropyltrimethoxy silane and 6 parts of tetramethoxy silane were sufficiently stirred, relative to the total solution, and then 16 parts of TiO$_2$ sol (pH: 2, particle diameter: 10 nm, TiO$_2$ content: 20%), 8 parts of SiO$_2$ sol (pH: 4, particle diameter: 20 nm, SiO$_2$ content: 20%) and 6 parts of ion-exchanged water were mixed, dropped at room temperature with attending to exothermic change and sufficiently stirred. As a result, a transparent copolymer of a photocatalyst, silica and silane was obtained. To the synthesized solution, 44 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

COMPARATIVE EXAMPLES

Comparative Example 1

16 parts of TiO$_2$ sol (pH: 2, particle diameter: 10 nm, TiO$_2$ content: 20%), 8 parts of SiO$_2$ sol (pH: 4, particle diameter: 20 nm, SiO$_2$ content: 20%) and 60 parts of ion-exchanged water were mixed, sufficiently stirred at room temperature, and then 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred, and then packaged with a 30 micron filter.

Comparative Example 2

In a 4-neck flask fixed with a stirrer, a reflux condenser, a thermometer, a dropping funnel and a nitrogen introducer, 0.2 parts of zirconium tetrabutoxide, 6 parts of aminopropyltrimethoxy silane and 6 parts of tetraethoxy silane were sufficiently stirred for 30 minutes, relative to the total solution, and then 40 parts of ion-exchanged water and 2 parts of acetic acid were mixed and dropped slowly at room temperature for 2 hours. After dropping, the mixture was stirred at room temperature for 24 hours. A transparent copolymer of silane was obtained. To the synthesized solution, 16 parts of TiO$_2$ sol (pH: 2, particle diameter: 10 nm, TiO$_2$ content: 20%), 8 parts of SiO$_2$ sol (pH: 4, particle diameter: 20 nm, SiO$_2$ content: 20%), 4 parts of ion-exchanged water, 10 parts of ethanol and 0.7 parts of ammonium metavanadate, 0.28 parts of hexafluorozirconic acid and 0.5 parts of phosphoric acid, a leveling agent and a defoamer were introduced, sufficiently stirred for 30 minutes, and then packaged with a 30 micron filter.

Experimental Example

1. Formation of Self-Cleaning Coating Layer

Ho-dip galvanized steel sheet (GI) having a coating amount of 60 g/m$^2$ on the basis of one side was used as a matter steel sheet for applying surface treating compositions thereon (sheet thickness=0.5 mm). Said hot-dip galvanized steel sheet was deposited in a condition of 20 g/L and a temperature of 60° C. for 2 minutes using a silicate alkali degreasing agent, and washed in deionized water for 2 minutes, and then the hot-air dried sheet was used as a specimen sheet.

With regard to application of the self-cleaning resin composition prepared in Example 1, the resin composition was applied on the upper part of the specimen using a continuous roll coating simulator in a thickness of ~2 μm, cured at a PMT condition of 20 to 110° C. and then air-cooled, or cured at a PMT condition of 110 to 300° C. and then water-cooled. The coating amount of the film was 500 to 1,100 mg/m$^2$.

The cross-section of the coating specimen was measured using scanning electron microscope (JEOL JSM-7001F). As a result, the thickness of the resin layer was identified to be about 0.89 μm, as could be seen from FIG. 1.

2. Analysis of XPS (X-Ray Photoelectron Spectroscopy)

Figure 2:
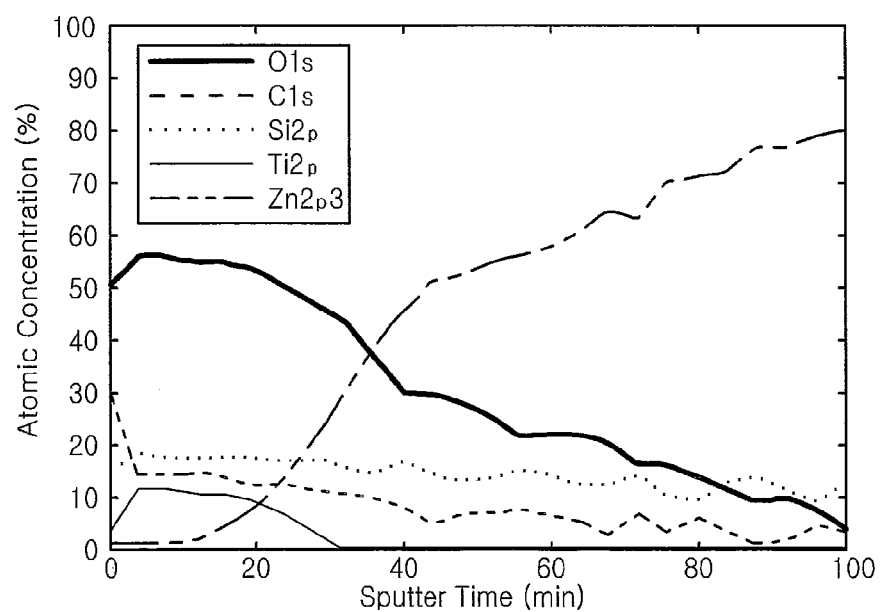
FIG. 2 is a result of analyzing XPS in a coating layer of the present invention.

Components in the coating layer were measured over time in a depth direction, using XPS (PHI Quantera SXM, Bema size: 9 μm, Anode type: monochromated Al kα). As a result, as could be seen from FIG. 2, it could be noted that the initial amount of $TiO_2$ resin was high, but the amount of Zn layer was increased together with reduction of $TiO_2$ over time. Therefore, it could be identified that the $TiO_2$ layer was present in the upmost part of the coating layer surface.

3. Measurement of Contact Angle

Figures 3, 4:
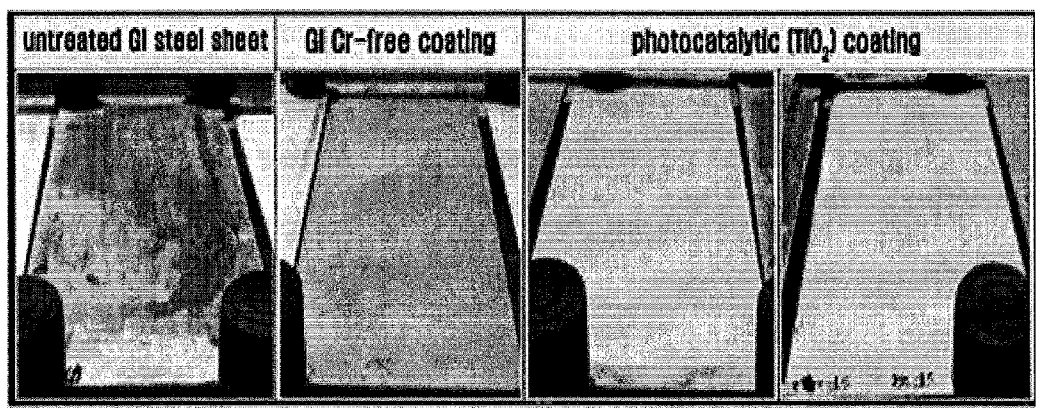
FIG. 3 is a result of testing water contact angles in a coating layer of the present invention.
FIG. 4 is a result of outdoor exposure test in a coating layer of the present invention.

A water contact angle was investigated on a surface of a steel sheet coated with a self-cleaning solution. The water contact angle was measured by means of a contact angle measuring instrument (Drop Shape Analysis System KRUSS DSA100S) within 10 seconds after waterdrops were dropped from a microsyringe on a surface of the specimen. As a result, as could be seen from FIG. 3, the steel sheet coated with the self-cleaning resin composition of the present invention had a water contact angle of 12° prior to UV irradiation and 9° after UV irradiation to represent superhydrophilicity. However, other self-cleaning steel sheet (trade name: BeckeryFresh) had a water contact angle of 60~70° and POSCO GI Cr-free steel sheet (trade name: POS-G-Green) had a water contact angle of 50°, as measured for comparison.

4. Outdoor Exposure Test

Steel sheets contaminated with carbon black, iron oxide, tobacco ashes and marker pens were exposed outside to observe the self-cleaning effect for 4 months. As a result, as could be seen from FIG. 4, the photocatalytic self-cleaning steel sheet had more excellent surface cleanness, compared to GI untreated and Cr-free steel sheets.

5. Anticorrosion Experiment

Figure 5:
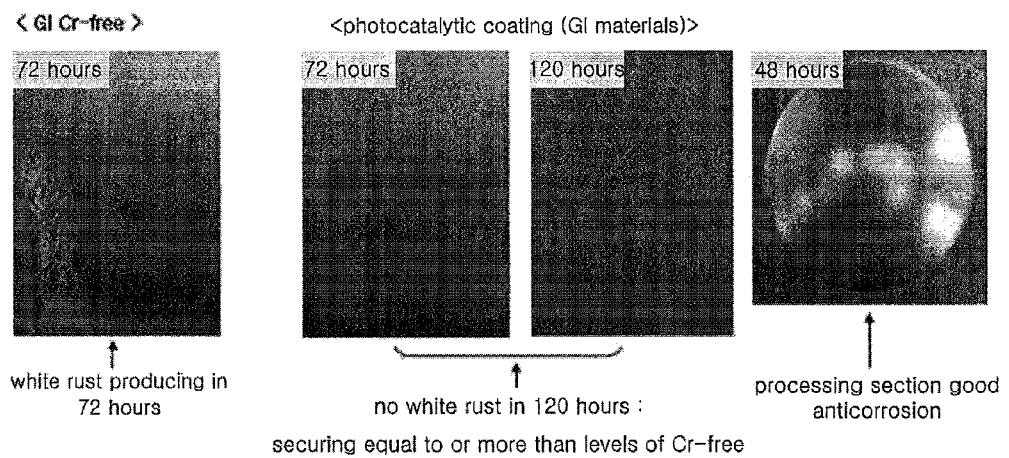
FIG. 5 is a result of anticorrosion test in a coating layer of the present invention.
Figure 6:
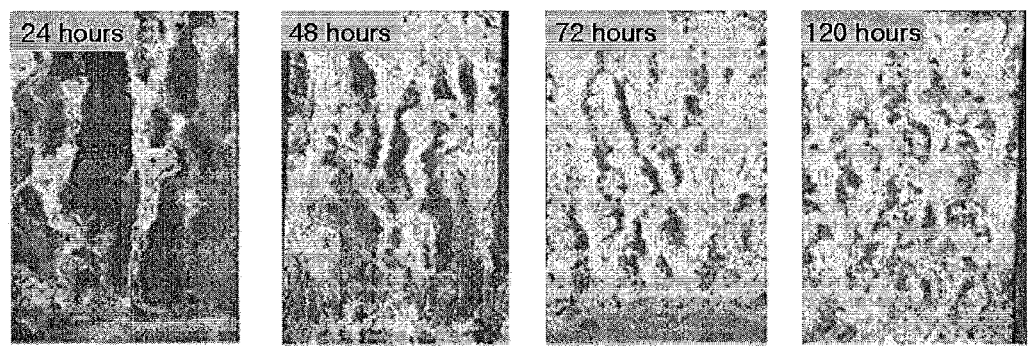
FIG. 6 is a result of anticorrosion test in a coating layer according to a comparative example.

In a salt spray test (S.S.T.) of a planar section, the coated specimen was stored at 5% NaCl and 35° C., and tested for 72 hours to observe white rust. Also, in the S.S.T. test of a processing section, following carrying out Erichsen test (6 mm), it was performed at 5% NaCl and 35° C. for 24 hours to observe white rust. As a result, as represented in FIG. 5, it could be identified that the steel sheet coated with the photocatalytic resin composition in Example 1 of the present invention represented equal to or more than anticorrosion compared to the Cr-free steel sheet and the processing section had excellent anticorrosion as well. However, as a result of observing anticorrosion of the steel sheet coated with the simply mixed resin composition of $TiO_2$-sol and $SiO_2$-sol as prepared in Comparative Example 2 by the same method, as could be seen from FIG. 6, it could be identified that it had poor anticorrosion, with producing white rust from 24 hours and overall white rust in 72 hours.

6. Coating Adhesion Experiment

Figure 7:
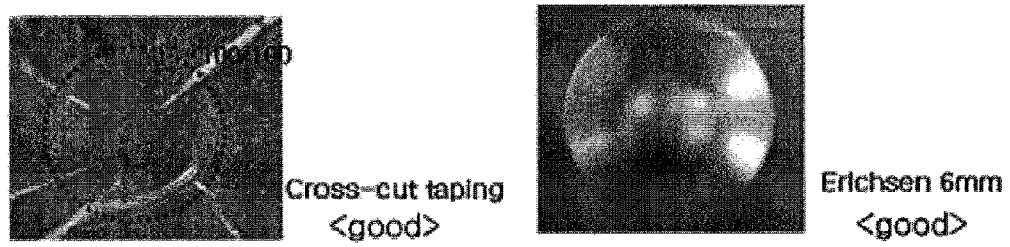
FIG. 7 is a result of coating adhesion test in a coating layer of the present invention.

The coated film was subjected to a cross cut stripping test (tape stripping test after carrying out a cross cut Erichsen test (6 mm)). Horizontal and vertical lines to reach the substrate were each engraved on the film by 11 lines at 1 mm intervals to make 100 patterns of 1 $mm^2$, and a tape was attached thereon and rapidly removed. As a result, as could be seen from FIG. 7, the steel sheet coated with the resin composition according to Example 1 of the present invention represented excellent coating adhesion.

Figure 8:
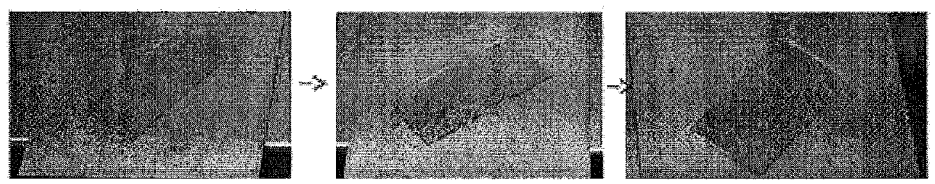
FIG. 8 is a result of organics degradation test in a coating layer of the present invention.

7. Organics Degradation Test 10 mg/l of methylene blue solution was dropped on the coated steel sheet, and irradiated with a UV light for 10 minutes to observe coloring. As a result, as could be seen from FIG. 8, it was identified that the coating layer according to the present invention manifested performance of degrading organics, with being gradually pale in color of methylene blue over time.

8. Test of Comparing State of Resin Composition Solutions

Figure 9:
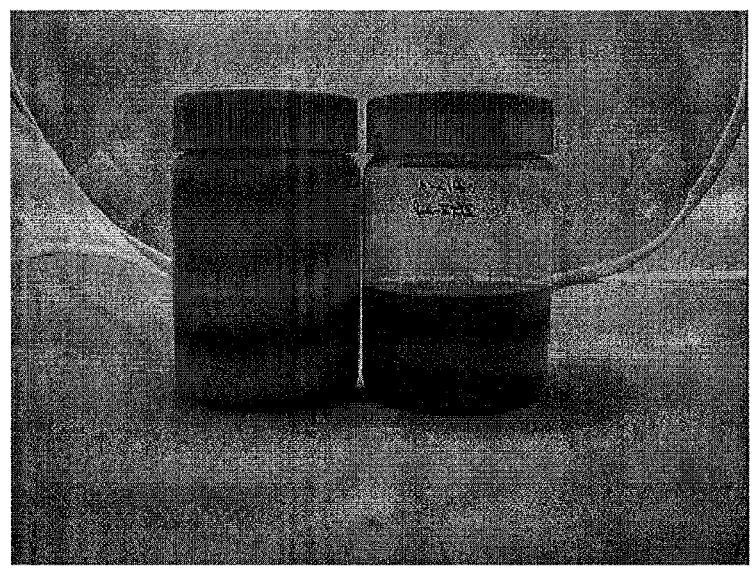
FIG. 9 is a result of solution state comparison test in a composition according to the present invention.

The resin composition solution according to the present invention was compared, in view of the solution state, with the simply mixed solution of $TiO_2$ sol and $SiO_2$ sol according to Comparative Example 1. As a result, as could be seen from FIG. 9, it could be identified that the simply mixed solution (left) of $TiO_2$ sol and $SiO_2$ sol represented an opaque color and a sticky state to be unsuitable to coating.

The invention claimed is:

1. A self-cleaning article comprising:
a steel sheet; and
a coating layer applied on said steel sheet,
wherein said coating layer consists of a composition consisting of a cohydrolysis condensate of i) an $SiO_2$ sol, ii) silane, and iii) a $TiO_2$ sol with photocatalytic $TiO_2$,
wherein Si present in said silane and said $SiO_2$ sol and Ti present in said $TiO_2$ sol are chemically bonded, said cohydrolysis condensate comprises a unit of —Si—O—Ti— providing $TiO_2$ at a surface of the coating layer,
wherein said $SiO_2$ sol is a sol in which silica in a nano size is water-dispersed, and silica has a diameter of 5 to 20 nm, a content ratio of said silica included in said $SiO_2$ sol is 20 to 40% by weight,
wherein said $SiO_2$ sol is an acidic or neutral $SiO_2$ sol,
wherein said $Sio_2$ sol is included in an amount of 1 to 20 parts by weight, based on 100 total parts by weight of said composition,
wherein said silane is included in an amount of 1 to 30 parts by weight, based on 100 total parts by weight of said composition, said silane is a combination of a trifunctional silane and a tetrafunctional silane,
wherein said $TiO_2$ sol is a sol in which $TiO_2$ is water-dispersed, and said $TiO_2$ sol is an acidic or neutral $TiO_2$ sol,
wherein said $TiO_2$ sol is included in an amount of 5 to 60 parts by weight, based on 100 total parts by weight of said composition,
wherein said composition further consists of an additive for anticorrosion and a phosphoric acid, said additive for anticorrosion is selected from the group consisting of an organic acid salt, an inorganic acid salt, and a hydroxide of a metal, said metal is chemically coupled to said Si present in said silane and said $SiO_2$ sol to form a unit of —Si—O-M-,
wherein M is at least one metal selected from the group consisting of V and Zr,
wherein said additive for anticorrosion is included in an amount of 0.1 to 5 parts by weight, based on 100 total parts by weight of said composition.

2. The self-cleaning article of claim 1, wherein said additive for anticorrosion is said hydroxide of said metal, said metal is chemically coupled to said Si present in said silane and said $SiO_2$ sol to form said unit of —Si—O-M-, wherein M is at least one metal selected from the group consisting of V and Zr.

* * * * *